United States Patent
Kim et al.

(10) Patent No.: US 12,009,529 B2
(45) Date of Patent: Jun. 11, 2024

(54) SECONDARY BATTERY CASE AND SECONDARY BATTERY

(71) Applicant: LG Energy Solution, Ltd., Seoul (KR)

(72) Inventors: Hyun Beom Kim, Daejeon (KR); Kyu Hyun Choi, Daejeon (KR); Min Kyu Min, Daejeon (KR)

(73) Assignee: LG Energy Solution, Ltd., Seoul (KR)

(*) Notice: Subject to any disclaimer, the term of this patent is extended or adjusted under 35 U.S.C. 154(b) by 53 days.

(21) Appl. No.: 17/569,758

(22) Filed: Jan. 6, 2022

(65) Prior Publication Data

US 2022/0216543 A1   Jul. 7, 2022

(30) Foreign Application Priority Data

Jan. 7, 2021 (KR) .................. 10-2021-0002204

(51) Int. Cl.
*H01M 50/105* (2021.01)
*H01M 50/136* (2021.01)
*H01M 50/238* (2021.01)

(52) U.S. Cl.
CPC ....... *H01M 50/105* (2021.01); *H01M 50/136* (2021.01); *H01M 50/238* (2021.01)

(58) Field of Classification Search
CPC .. H01M 50/10; H01M 50/102; H01M 50/105; H01M 50/136; H01M 50/238;
(Continued)

(56) References Cited

U.S. PATENT DOCUMENTS

2018/0219245 A1   8/2018   Choi et al.
2019/0229301 A1   7/2019   Li et al.
(Continued)

FOREIGN PATENT DOCUMENTS

CN   106384839 A    2/2017
EP   3561899 A1   10/2019
(Continued)

OTHER PUBLICATIONS

Extended European Search Report including Written Opinion for Application No. 21213580.0 dated Jun. 2, 2022, pp. 1-8.
(Continued)

*Primary Examiner* — Mayla Gonzalez Ramos
*Assistant Examiner* — Bethany C Garcia
(74) *Attorney, Agent, or Firm* — Lerner David LLP (57) ABSTRACT

A secondary battery case accommodates an electrode assembly having a structure in which electrodes and separators are alternately arranged, and includes a first cup having a recessed shape, a second cup having a recessed shape and provided on one side of the first cup, a first peripheral portion surrounding a perimeter of the first cup when the secondary battery case is unfolded, and a second peripheral portion surrounding a perimeter of the second cup when the secondary battery case is unfolded. The first peripheral portion includes a first cup-corresponding peripheral portion that corresponds to a width of the first cup, and the second peripheral portion includes a second cup-corresponding peripheral portion that corresponds to the second cup. The width of the first cup is greater than a length of the first cup-corresponding peripheral portion thereby reducing if not eliminated a bat-ear otherwise formed during manufacture.

19 Claims, 5 Drawing Sheets

(58) Field of Classification Search
CPC ............. H01M 10/052; H01M 50/178; H01M 50/116; H01M 50/557; H01M 50/124; H01M 50/186; H01M 50/55; H01M 50/133; H01M 10/0436; H01M 10/0585; H01M 10/045; H01M 10/647; H01M 10/0459; H01M 10/0525; H01M 10/058; H01M 2220/20; Y02E 60/10; Y02P 70/50; B29L 2031/7146; B29C 33/42; B29C 43/021; B29C 51/08; B29C 51/16; B29C 53/38; B29C 65/02; B29C 66/1312; B29C 66/549

See application file for complete search history.

(56) References Cited

U.S. PATENT DOCUMENTS

| | | |
|---|---|---|
| 2019/0386330 A1 | 12/2019 | Choi et al. |
| 2020/0280044 A1 | 9/2020 | Park et al. |
| 2020/0365836 A1 | 11/2020 | Jung et al. |
| 2023/0216113 A1* | 7/2023 | Min .................... H01M 50/131 429/163 |

FOREIGN PATENT DOCUMENTS

| | | |
|---|---|---|
| KR | 20170052061 A | 5/2017 |
| KR | 20190010434 A | 1/2019 |
| KR | 20190090153 A | 8/2019 |
| KR | 20190106473 A | 9/2019 |
| KR | 20210011813 A | 2/2021 |
| KR | 20210077528 A | 6/2021 |
| KR | 20210077631 A | 6/2021 |
| WO | 2021125842 A1 | 6/2021 |

OTHER PUBLICATIONS

International Search Report for Application No. PCT/KR2022/000098 dated Apr. 11, 2022, pp. 1-2. [See p. 1, categorizing the cited references].

* cited by examiner

[FIG. 1]

PRIOR ART

SECONDARY BATTERY CASE AND SECONDARY BATTERY

CROSS-REFERENCE TO RELATED APPLICATIONS

This application claims the priority of Korean Patent Application No. 10-2021-0002204 filed on Jan. 7, 2021, in the Korean Intellectual Property Office, the disclosure of which is incorporated herein by reference.

BACKGROUND OF THE INVENTION

Field of the Invention

The present invention relates to a secondary battery case and a secondary battery, and more particularly, to a secondary battery case and a secondary battery, wherein an unnecessarily protruding or deforming region on the exterior of the secondary battery case is reduced to reduce the volume of the secondary battery, thereby also reducing a dead space not contributing to the capacity of the secondary battery. This construction enhances energy density, causes inaccurate measurement of the full width of a cell, lowers if not eliminates crack risk, improves assemblability of a battery module, and reduces the costs of thermal resin for cooling the cell.

Description of the Related Art

Secondary batteries are repeatedly chargeable and dischargeable and may be classified into a cylindrical secondary battery, a prismatic secondary battery, a pouch-type secondary battery, or the like, depending on structures and manufacturing methods thereof. Among these secondary batteries, the pouch-type secondary battery generally accommodates an electrode assembly having a structure in which electrodes and separators are alternately arranged within a sheet-shape pouch exterior.

Figure 1:
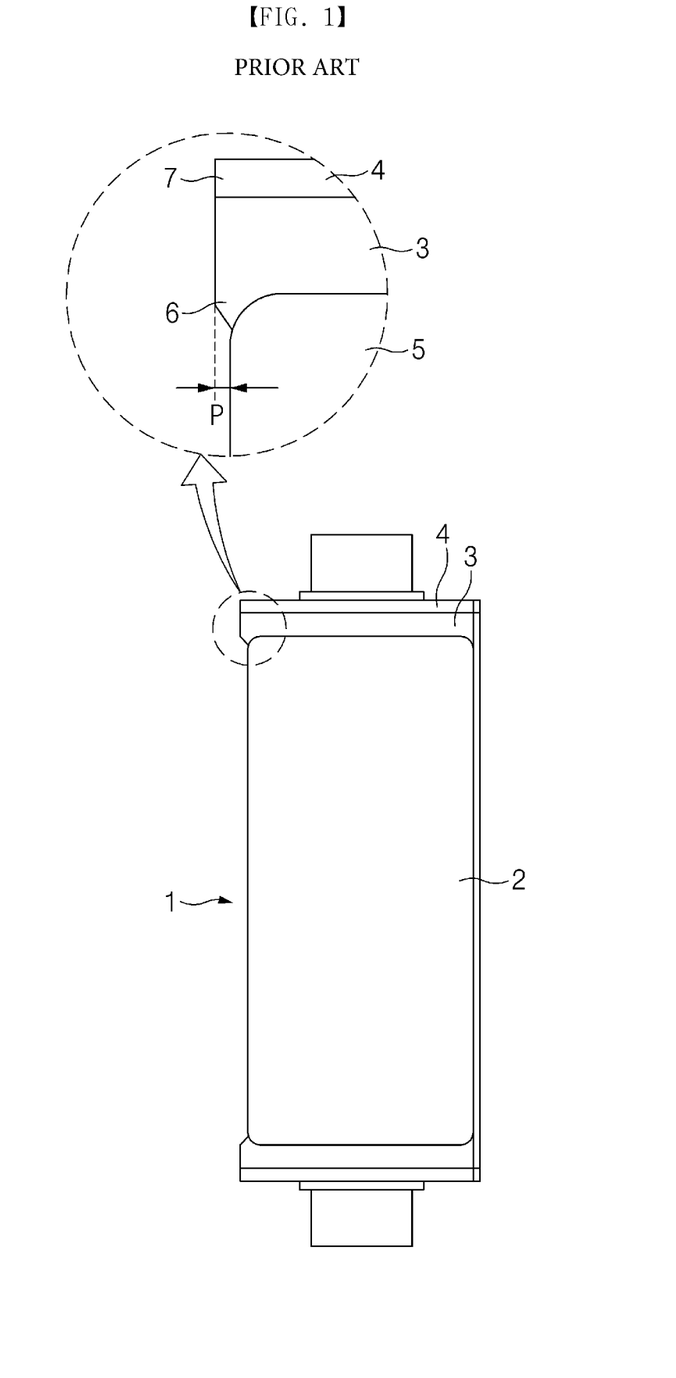
FIG. 1 is a top elevation view illustrating a structure of a secondary battery manufactured according to the related art.

According to the related art, and with reference to FIG. 1, a pouch-type secondary battery 1 is manufactured during a forming process in which a portion of a sheet-shape pouch, corresponding to a surface area of an electrode assembly, is pressed to form a cup 5 having a recessed shape. Then, the electrode assembly is mounted within the cup 5 formed in the pouch. Subsequently, some regions of a peripheral portion 3 formed in a perimeter of the cup 5 in a pouch region are attached to each other to form a sealing portion 4. The sealing portion formed by attaching some regions of the peripheral portion of the pouch cup to each other and a region of the peripheral portion other than the sealing portion are regions which were not pressed during the forming process.

Here, due to a height difference between the peripheral portion and the sealing portion, which were not subjected to the forming and pressing process, and the cup, which was subjected to the forming process, some regions of the peripheral portion and the sealing portion are located outside the width of the cup during a folding operation or a degassing operation as the secondary battery is manufactured.

FIG. 1 illustrates a state in which some regions of the peripheral portion 3 and the sealing portion 4, which are formed in each of upper and lower portions of a pouch 2 of the pouch-type secondary battery 1, protrude by P outside the width of a cup in which an electrode assembly is accommodated.

This protruding region is referred to as a bat-ear. The bat-ear is a portion that unnecessarily protrudes and is deformed in the exterior of a secondary battery case, causing an increase in a dead space that does not contribute to a capacity of the secondary battery. As a result, the energy density of the secondary battery is degraded. Also, the bat-ear causes inaccurate measurement of the full width of a cell, raises the risk of cracking, can lead to the deterioration in assemblability of a battery module, and can increase the costs of thermal resin for cooling the cell.

The bat-ear may be classified into a cup edge bat-ear portion 6 and an end bat-ear portion 7, and both the cup edge bat-ear portion 6 and the end bat-ear portion 7 need to be reduced. The limitations listed above are not resolved by removing only one of the two bat-ear portions. Accordingly, methods capable of removing both the cup edge bat-ear portion 6 and the end bat-ear portion 7 have been researched.

SUMMARY OF THE INVENTION

An aspect of the present invention provides a secondary battery case and a secondary battery, wherein an unnecessarily protruding or deforming region is reduced in the exterior of the secondary battery case to reduce the volume of the secondary battery, thereby reducing a dead space not contributing to the capacity of the secondary battery. Accordingly, it is possible to enhance the energy density, improve inaccurate measurement of the full width of a cell, prevent a crack risk, improve assemblability of a battery module, and reduce the costs of thermal resin for cooling the cell.

According to an aspect of the present invention, there is provided a secondary battery case configured to accommodate an electrode assembly having a structure in which electrodes and separators are alternately arranged, the secondary battery case including: a first cup having a recessed shape; a second cup having a recessed shape and provided on one side of the first cup; a first peripheral portion surrounding a perimeter of the first cup when the secondary battery case is unfolded; and a second peripheral portion surrounding a perimeter of the second cup when the secondary battery case is unfolded, wherein the first peripheral portion includes a first cup-corresponding peripheral portion that corresponds to a width of the first cup, and the second peripheral portion includes a second cup-corresponding peripheral portion that corresponds to a width of the second cup, wherein when viewed in a cross-sectional view in which the widths of the first cup and the second cup are shown, the width of the first cup is greater than a dimension of the first cup-corresponding peripheral portion.

The width of the first cup may be measured as a distance from a medial wall portion of the first cup to a first reference vertical line which is perpendicular to the first peripheral portion and passes through an upper end point of a lateral wall portion of the first cup, and the dimension of the first cup-corresponding peripheral portion may be a distance from a peripheral connection point, at which the first peripheral portion meets the second peripheral portion, to a point (U1) on the first peripheral portion corresponding to the upper end point of the right wall portion of the first cup.

A region, in which the first peripheral portion is connected to the second peripheral portion, may be formed in a round shape having a predetermined radius (R1) of curvature, and the first cup-corresponding peripheral portion may include a first curved portion which is formed by a portion of the round shape and a first straight portion which is other than the first curved portion and has a straight shape.

The width of the first cup may be greater than a sum of a dimension of the first curved portion and a dimension of the first straight portion.

When viewed in the cross-sectional view, the first cup-corresponding peripheral portion and the second cup-corresponding peripheral portion may form a predetermined angle (θ) and have a V shape.

The predetermined angle (θ) may be between about 130 degrees and about 170 degrees.

The first predetermined radius of curvature may be approximately equal to or greater than 3 mm.

When viewed in the cross-sectional view, a distance (D) between the peripheral connection point, at which the first peripheral portion meets the second peripheral portion, and a bridge connection point, at which a medial wall portion of the first cup is connected to a lateral wall portion of the second cup, may be about 1 mm or less.

When viewed in the cross-sectional view, a region, in which a medial wall portion of the first cup is connected to a medial wall portion of the second cup, may be formed in a round shape having a predetermined radius (R2) of curvature, and the predetermined radius (R2) of curvature may be less than about 2 mm.

When viewed in the cross-sectional view, the width of the second cup may be greater than a dimension of the second cup-corresponding peripheral portion.

The width of the second cup may be measured as a distance from a medial wall portion of the second cup to a second reference vertical line which is perpendicular to the second peripheral portion and passes through an upper end point of a lateral wall portion of the second cup, and the dimension of the second cup-corresponding peripheral portion may be a distance from a peripheral connection point, at which the first peripheral portion meets the second peripheral portion, to a point on the second peripheral portion corresponding to the upper end point of the lateral wall portion of the second cup.

A region, in which the first peripheral portion is connected to the second peripheral portion, may be formed in a round shape having a predetermined radius (R1) of curvature, and the second cup-corresponding peripheral portion may include a second curved portion which is formed by a portion of the round shape and a second straight portion which is other than the second curved portion and has a straight shape.

The width of the second cup may be greater than a sum of a dimension of the second curved portion and a dimension of the second straight portion.

According to another aspect of the present invention, there is provided a secondary battery including: the secondary battery case according to the present invention; an electrode assembly inserted into the secondary battery case; and an electrolyte accommodated together with the electrode assembly within the secondary battery case.

According to yet another aspect of the present invention, a secondary battery case configured to accommodate an electrode assembly includes: a cup having a recessed shape and a peripheral portion surrounding a perimeter of the cup when the secondary battery case is unfolded. The peripheral portion comprises a cup-corresponding peripheral portion that corresponds to a width of the cup, and the width of the cup is greater than a dimension of the cup-corresponding peripheral portion.

The width of the cup may be measured as a distance from a first wall portion of the cup to a reference vertical line which may be perpendicular to the peripheral portion and pass through an upper end point of a second wall portion of the cup, and the dimension of the cup-corresponding peripheral portion may be a distance from a peripheral connection point, which may be a point on the peripheral portion and along a fold line in which the secondary battery case may be folded, to a point on the peripheral portion corresponding to the upper end point of the second wall portion of the cup.

The cup-corresponding peripheral portion may include a curved portion having a predetermined radius of curvature and a straight portion.

The width of the cup may be greater than a sum of a dimension of the curved portion and a dimension of the straight portion.

The secondary battery case may further include an electrode assembly and an electrolyte provided within the secondary battery case.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Hereinafter, embodiments of the present invention will be described in detail with reference to the accompanying drawings so as to be easily carried out by a person skilled in the art to which the present invention pertains. However, the present invention may be implemented in various different forms, and is neither limited nor restricted to the following embodiments.

In order to clearly describe the present invention, parts irrelevant to the description are omitted, and descriptions related to well-known functions or configurations are ruled out so as not to unnecessarily obscure subject matters of the present invention. In the specification, when reference numerals are given to components in each of the drawings, the same or similar components will be designated by the same or similar reference numerals throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways. Also as used herein, the terms "substantially," "generally," "approximately," and "about" are intended to mean that slight deviation from absolute are included within the scope of the term so modified.

Embodiment 1

Figure 2:
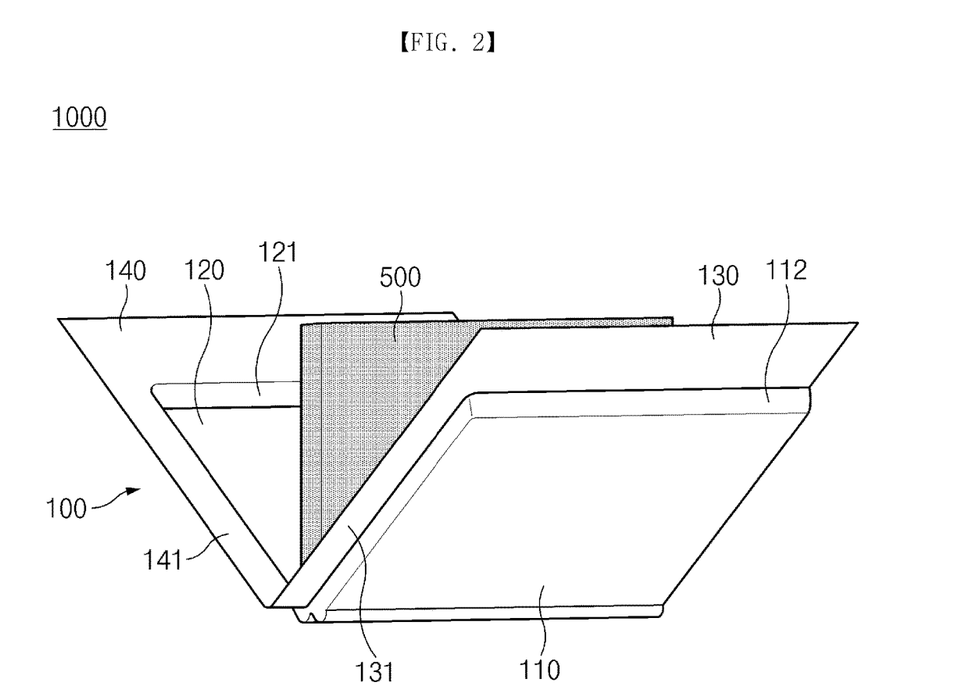
FIG. 2 is a conceptual perspective view illustrating a state of a secondary battery in which an electrode assembly is being accommodated in a secondary battery case according to an embodiment of the present invention.
Figure 3:
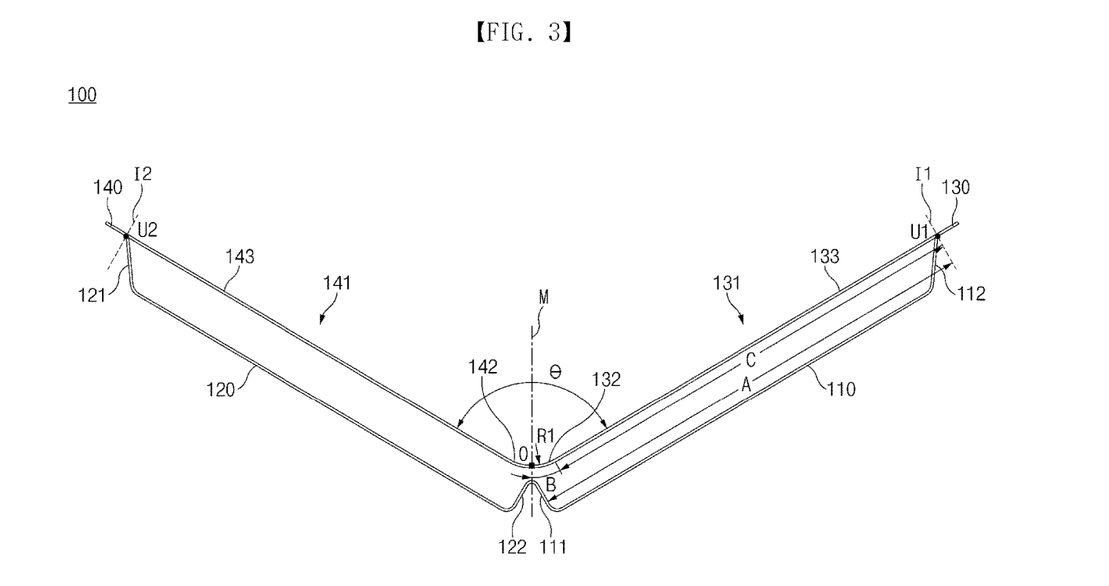
FIG. 3 is a side elevation view illustrating a secondary battery case of FIG. 2.
Figure 4:
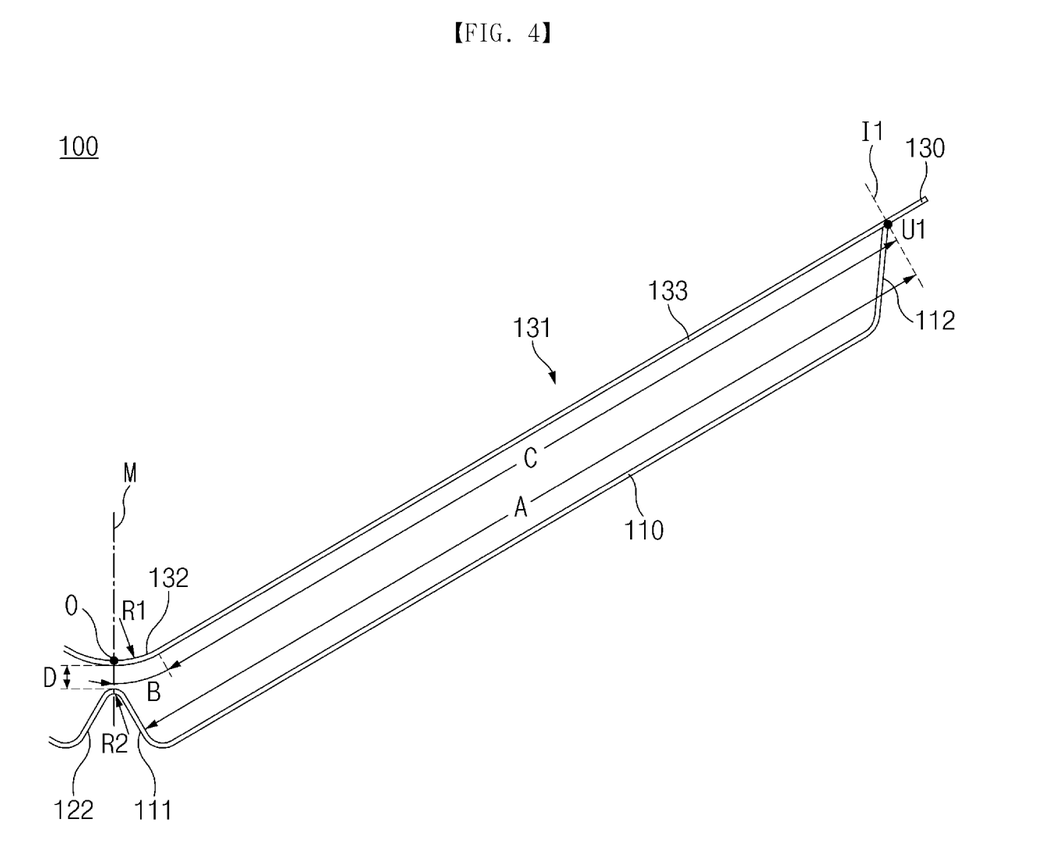
FIG. 4 is an enlarged side elevation view showing in detail a width of a first cup of FIG. 3.
Figure 5:
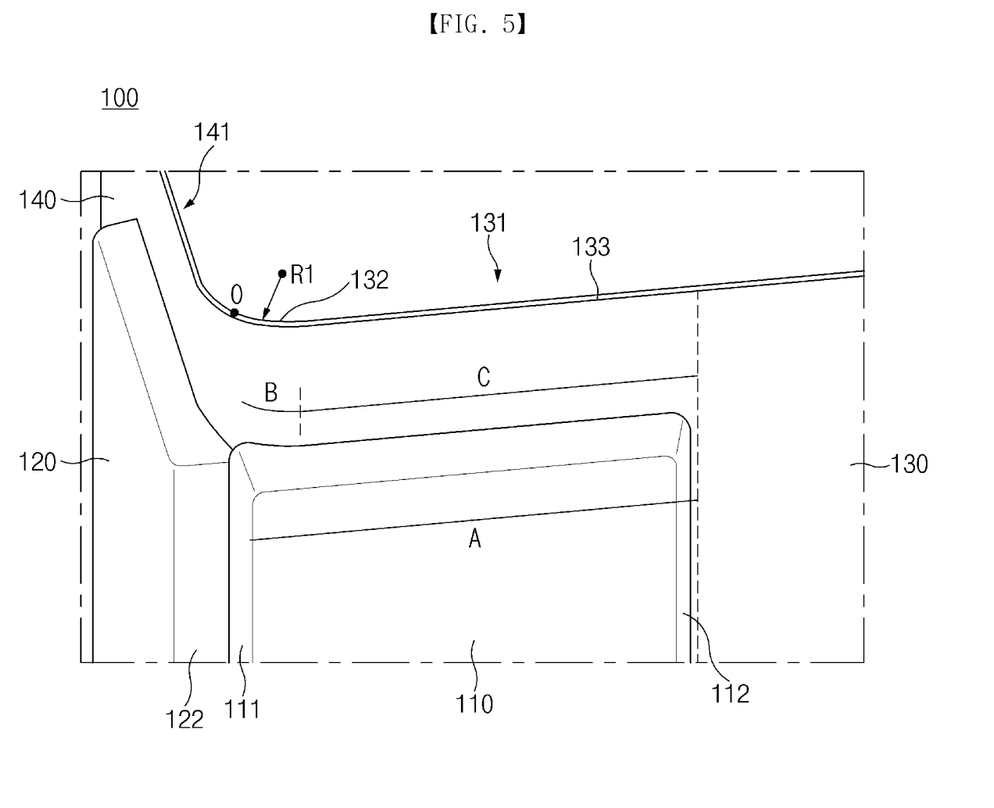
FIG. 5 is a perspective view showing a pre-folded state of the secondary battery case of FIG. 2.
Figure 6:
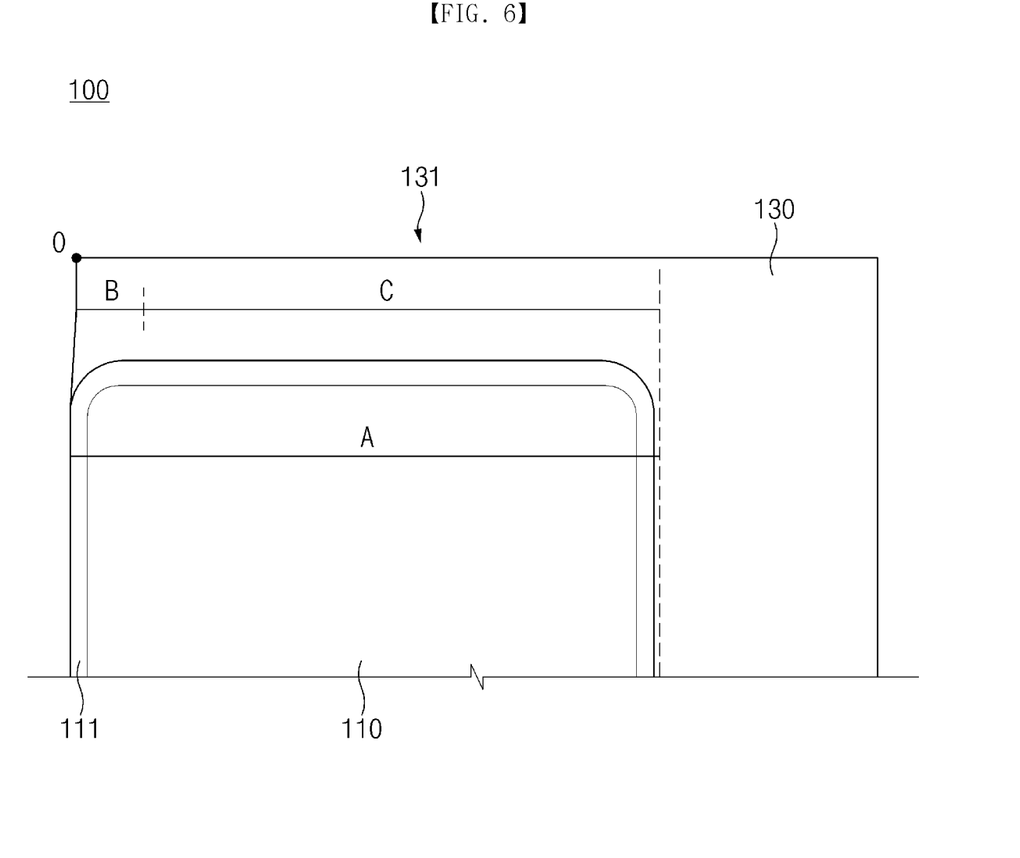
FIG. 6 is a perspective view showing an after folding state of the secondary battery case of FIG. 2.

FIG. 2 is a conceptual perspective view illustrating a state of a secondary battery in which an electrode assembly is being accommodated in a secondary battery case according to an embodiment of the present invention. FIG. 3 is a side elevation view illustrating a secondary battery case according to a first embodiment of the present invention. FIG. 4 is an enlarged partial view depicting in detail a width of a first cup of FIG. 3. FIG. 5 is a perspective view showing a pre-folded state of the secondary battery of the first embodiment. FIG. 6 is a perspective view showing the secondary battery according to the first embodiment in a folded condition.

Referring to FIGS. 2 to 4, a secondary battery case 100 according to a first embodiment (Embodiment 1) of the present invention may be a secondary battery case 100 capable of accommodating an electrode assembly having a structure in which electrodes and separators are alternately arranged. Particularly, the secondary battery case 100 may be a pouch case in a pouch-type secondary battery 1000. The secondary battery case 100 according to Embodiment 1 of the present invention may include a first cup 110, a second cup 120, a first peripheral portion 130, and a second peripheral portion 140.

Each of the first cup 110 and the second cup 120 may be a portion that is recessed relative to the first and second peripheral portions. The second cup 120 may be provided on one side of the first cup 110. When the case is folded, the first cup 110 and the second cup 120 may be joined to form an inner space. An electrode assembly 500 may be accommodated in this inner space (see FIG. 2).

The first peripheral portion 130 of the secondary battery case 100 may be a portion which surrounds the perimeter of the first cup 110 when the case is unfolded. The second peripheral portion 140 may be a portion which surrounds the perimeter of the second cup 120. As illustrated in FIGS. 2 and 3, the first peripheral portion 130 and the second peripheral portion 140 may be in contact with each other at a peripheral connection point O when the secondary battery case 100 is folded.

As used herein, a 'state in which the case is unfolded' may represent a pre-folded state when the case is spread out.

The first peripheral portion 130 may include a first cup-corresponding peripheral portion 131 that corresponds to a width of the first cup 110. The second peripheral portion 140 may include a second cup-corresponding peripheral portion 141 that corresponds to a width of the second cup 120.

Also, when viewed from a perspective of FIG. 3 or 4 in which the widths of the first cup 110 and the second cup 120 are shown, a width A of the first cup 110 may be greater than a width of the first cup-corresponding peripheral portion 131 in the secondary battery case 100 according to Embodiment 1 of the present invention.

Specifically, the width of the first cup 110 may be a distance from a left (medial) wall portion 111 of the first cup 110 to a first reference vertical line I1 which is perpendicular to the first peripheral portion 130 and passes through an upper end point of a right wall portion 112 of the first cup 110. The width of the first cup 110 is illustrated as A in FIG. 4.

The width of the first cup-corresponding peripheral portion 131 may be a distance from a peripheral connection point O, at which the first peripheral portion 130 meets the second peripheral portion 140, to a point U1 on the first peripheral portion 130 corresponding to the upper end point of the right wall portion 112 of the first cup 110. The width of the first cup-corresponding peripheral portion 131 is a distance along the first peripheral portion 130 from O to U1 in FIG. 3 or 4.

The first cup-corresponding peripheral portion 131 may include a curved portion and a straight portion. Particularly, referring to FIG. 4, a region, in which the first peripheral portion 130 is connected to the second peripheral portion 140, may be formed in a round shape having a predetermined radius R1 of curvature, and the first cup-corresponding peripheral portion 131 may include a first curved portion 132 which is formed by a portion of the round shape and a first straight portion 133 which has a straight shape. The dimension of the first curved portion 132 may be a dimension illustrated as B in FIG. 4. The dimension of the first straight portion 133 may be a dimension illustrated as C in FIG. 4. In this case, the dimension of the first cup-corresponding peripheral portion 131 may be a sum of the dimension B of the first curved portion 132 and the dimension C of the first straight portion 133.

Thus, in the secondary battery case 100 according to Embodiment 1 of the present invention, the width A of the first cup 110 may be greater than the sum of the dimension B of the first curved portion 132 and the dimension C of the first straight portion 133. This may represent that the sum of the length B of the first curved portion 132 and the length C of the first straight portion 133 is less than the width A of the first cup 110.

A battery case 100 manufactured as described above in Embodiment 1 of the present invention, will redue, if not eliminate, the size of a bat-ear. Accordingly, a dead space will not exist and energy density of the battery will be improved.

FIG. 5 is a view before the secondary battery case 100 according to the present invention is folded, and FIG. 6 is a view showing the secondary battery case 100 in a folded state.

The secondary battery case 100 is configured such that the width A of the first cup 110 is greater than the sum of the dimensions B of the first curved portion 132 and the dimensions C of the first straight portion 133. This may represent that the sum of the dimension B of the first curved portion 132 and the dimension C of the first straight portion 133 is less than the width A of the first cup 110. In this case, as illustrated in FIG. 6, a portion of B+C is indented inward (in the right direction in FIG. 6) from the outer boundary of a cup portion. Thus, the size of the bat-ear may be reduced. That is, the peripheral portions are tightly pulled inward, and thus, the bat-ear is reduced or eliminated.

Particularly, in this case, there may be a significant effect in which the end bat-ear portion 7 is reduced or removed (refer to FIG. 1 for the end bat-ear portion 7). When the bat-ear is removed, the dead space described above is also, in turn, reduced, and the energy density may be enhanced. Moreover, it is also possible to improve inaccurate measurement of the full width of the cell, prevent the risk of cracking, improve assemblability of the battery module, and reduce the costs of thermal resin for cooling the cell.

In the secondary battery case 100 according to Embodiment 1 of the present invention, the features of the configuration shown in the first cup 110 and the first peripheral portion 130 may be applied to the second cup 120 and the second peripheral portion 140.

Particularly, when viewed from an orientation in which the widths of the first cup 110 and the second cup 120 are shown, the width of the second cup 120 may be greater than the dimension of the second cup-corresponding peripheral portion 141.

Here, the width of the second cup 120 may be a distance from a right (medial) wall portion 122 of the second cup 120 to a second reference vertical line I2 which is perpendicular to the second peripheral portion 140 and passes through an upper end point of a left wall portion 121 of the second cup 120.

Also, the dimension of the second cup-corresponding peripheral portion 141 may be a distance from the peripheral connection point O, at which the first peripheral portion 130 meets the second peripheral portion 140, to a point U2 on the second peripheral portion 140 corresponding to the upper end point of the left wall portion 121 of the second cup 120.

The region, in which the first peripheral portion 130 is connected to the second peripheral portion 140, may be formed in the round shape having the predetermined radius R1 of curvature, and the second cup-corresponding peripheral portion 141 may include a second curved portion 142 which is formed by a portion of the round shape and a second straight portion 143 having a straight shape. In the secondary battery case 100 according to Embodiment 1 of the present invention, the width of the second cup 120 may be greater than a sum of a dimension of the second curved portion 142 and a dimension of the second straight portion 143. This may represent that the sum of the dimension of the second curved portion 142 and the dimension of the second straight portion 143 is less than the width of the second cup 120.

With the above configuration, as described above, the unnecessarily protruding or deforming region (i.e., the bat-ear) may be reduced or eliminated to enhance the energy density of the secondary battery case 100.

In the present invention, the configuration shown on the first cup 110 and the first peripheral portion 130 and the configuration shown on the second cup 120 and the second peripheral portion 140 may be symmetric with respect to a central vertical axis M. However, the present invention is not limited thereto, and an asymmetric configuration may be applied to the present invention. For example, in some aspects, the secondary battery case 100 may be formed of a single cup.

Embodiment 2

A second embodiment (Embodiment 2) is provided herein. Embodiment 2 of the present invention is different from Embodiment 1 in that an additional configuration capable of reducing a bat-ear is added to a secondary battery case.

Embodiment 2 will be described with a focus on the differences, such that the common features shared between Embodiment 2 and Embodiment 1 are not again described hereinafter. Embodiment 2 of the present invention, as shown in FIG. 3, includes a first cup-corresponding peripheral portion 131 and a second cup-corresponding peripheral portion 141 forming a predetermined angle θ and having a V shape in a non-folded state. The predetermined angle θ may be between about 130 degrees and about 170 degrees. For reference, in this case, the angle formed by the first peripheral portion 130 and the second peripheral portion 140 may also be θ.

When the angle formed by the first cup-corresponding peripheral portion 131 and the second cup-corresponding peripheral portion 141 reduced and within such range, the bat-ear may be reduced effectively. Usually during a folding operation, some regions of a peripheral portion and a sealing portion extend beyond the width of the cup to form the bat-ear. As θ is reduced, a folding amount is reduced. Thus, an amount of the bat-ear may be reduced.

However, when θ is less than about 130 degrees, the angle between a right wall portion 112 of a first cup 110 and a bottom portion of the first cup 110 increases. Thus, a dead space in an outer region of the cup may be enlarged. That is, a space may be wasted because the dead space is increased due to the inclination of the right wall portion 112 of the first cup 110.

Also, when θ is greater than about 170 degrees, a dimension B of a first curved portion 132 may be excessively increased, thus causing an increase in the bat-ear. Particularly, an end bat-ear portion 7 may protrude further. Thus, an optimal range of the angle θ formed by the first cup-corresponding peripheral portion 131 and the second cup-corresponding peripheral portion 141 is between about 130 degrees and about 170 degrees.

Also, referring to FIG. 4, a region, at which the first peripheral portion 130 is connected to the second peripheral portion 140, may be formed in a round shape with a predetermined radius R1 of curvature. In this case, the predetermined radius R1 of curvature may be more than about 3 mm.

If the radius R1 of curvature is less than about 3 mm, when the predetermined angle θ is between about 130 degrees and about 170 degrees, a dimension B of a first curved portion 132 may be excessively increased, thus causing an increase in the bat-ear.

Also, referring to FIG. 4, a distance D between the peripheral connection point O, at which the first peripheral portion 130 meets the second peripheral portion 140, and a bridge connection point, at which a left wall portion 111 of the first cup 110 is connected to a right wall portion 122 of a second cup 120, may be about 1 mm or less. As the distance D increases, a cup edge bat-ear portion 6 may further protrude. Thus, it is desirable that the distance D is about 1 mm or less. Also, when D is nearly 0 mm, the cup edge bat-ear portion 6 may be removed. That is, when D is about 0 mm, the cup edge bat-ear portion 6 does not occur.

Also, referring to FIG. 4, a region, in which a left wall portion 111 of the first cup 110 is connected to a right wall portion 122 of the second cup 120, may be formed in a round shape with a predetermined radius R2 of curvature. In this case, the predetermined radius R2 of curvature may be less than about 2 mm.

As the radius R2 of curvature increases, the distance D may, in turn, increase. Also, as the radius R2 of curvature decreases, distance D may decrease. Thus, as the radius R2 of curvature increases, the cup edge bat-ear portion 6 may further protrude. Accordingly, R2 is preferably less than about 2 mm such that the cup edge bat-ear portion 6 is eliminated or minimized.

The below chart illustrates experimental data when θ is 140 degrees and 150 degrees, and when the bridge (R1) has various radii of curvature. No bat ear was formed in any of the four scenarios shown below.

| θ = 140 degrees, R1 = 10.0 mm | | θ = 140 degrees, R1 = 15.0 mm | | θ = 140 degrees, R1 = 20.0 mm | | θ = 150 degrees, R1 = 30.0 mm | |
|---|---|---|---|---|---|---|---|
| A | 50.153 | A | 50.153 | A | 50.153 | A | 50.153 |
| B | 3.554 | B | 5.289 | B | 7.035 | B | 7.894 |
| C | 46.301 | C | 44.481 | C | 42.662 | C | 42.108 |
| B + C | 49.855 | B + C | 49.771 | B + C | 49.696 | B + C | 50.002 |
| A − (B + C) | 0.298 | A − (B + C) | 0.382 | A − (B + C) | 0.457 | A − (B + C) | 0.151 |
| D | 0.0 | D | 0.5 | D | 1.0 | D | 1.0 |

When the protrusion amount of the cup edge bat-ear portion 6 is reduced, an unnecessarily protruding or deforming region may be reduced in the exterior of the secondary battery case 100. Accordingly, a dead space that does not contribute to the capacity of a secondary battery 1000 is reduced and the energy density is enhanced. Moreover, it is possible to improve the accurate measurement of the full width of the cell, prevent the risk of cracking, improve assemblability of the battery module, and reduce the costs of thermal resin for cooling the cell.

Embodiment 3

FIG. 2 is a conceptual perspective view illustrating a state of a secondary battery in which an electrode assembly is being accommodated in a secondary battery case according to an embodiment of the present invention.

A third embodiment (Embodiment 3) of the present invention may include all of the aforementioned structure and functions of Embodiment 1 and Embodiment 2 as well as the following additional features. For brevity, features of Embodiment 3 that are commonly shared with Embodiment 1 and/or Embodiment 2 will not be described in detail hereinafter.

Referring to FIGS. 2 and 3, the secondary battery 1000 according to Embodiment 3 of the present invention may include a secondary battery case 100, an electrode assembly 500, and an electrolyte (not shown). Here, the secondary battery case 100 may be the same as the secondary battery case 100 described above in Embodiment 1 and Embodiment 2.

The electrode assembly 500 may be inserted into the secondary battery case 100, and the electrode assembly 500 may be accommodated together with the electrolyte within the secondary battery case 100. Then, the secondary battery case 100 may be folded such that the first cup 110 and the second cup 120 face each other. Subsequently, when the first peripheral portion 130 and the second peripheral portion 140 are sealed.

In the secondary battery 1000 according to Embodiment 3 of the present invention, the bat-ear may be reduced or eliminated. Particularly, one or both the cup edge bat-ear portion 6 and the end bat-ear portion 7 may be reduced or eliminated.

Accordingly, an unnecessarily protruding or deforming region in the exterior of the secondary battery 1000 may be reduced, and a dead space that does not contribute to the capacity of the secondary battery 1000 may be reduced. As a result, the energy density may be enhanced.

In the secondary battery case and the secondary battery according to the present invention, the unnecessarily protruding or deforming region in the exterior of the secondary battery case is reduced to reduce the volume of the secondary battery, thereby reducing the dead space that does not contribute to the capacity of the secondary battery. Accordingly, it is possible to enhance the energy density, improve the accurate measurement of the full width of the cell, prevent the risk of cracking, improve assemblability of the battery module, and reduce the costs of thermal resin for cooling the cell.

Although the present invention is described by specific embodiments and drawings, the present invention is not limited thereto, and various changes and modifications may be made by a person skilled in the art to which the present invention pertains within the technical idea of the present invention and equivalent scope of the appended claims.

What is claimed is:

1. A secondary battery case configured to accommodate an electrode assembly having a structure in which electrodes and separators are alternately arranged, the secondary battery case comprising:
    a first cup having a recessed shape;
    a second cup having a recessed shape and provided on one side of the first cup;
    a first peripheral portion surrounding a perimeter of the first cup when the secondary battery case is unfolded; and
    a second peripheral portion surrounding a perimeter of the second cup when the secondary battery case is unfolded,
    wherein the first peripheral portion comprises a first cup-corresponding peripheral portion that corresponds to a width of the first cup, and the second peripheral portion comprises a second cup-corresponding peripheral portion that corresponds to a width of the second cup,
    wherein the width of the first cup is greater than a dimension of the first cup-corresponding peripheral portion in a width direction.

2. The secondary battery case of claim 1, wherein the width of the first cup is measured as a distance from a medial wall portion of the first cup to a first reference vertical line which is perpendicular to the first peripheral portion and passes through an upper end point of a lateral wall portion of the first cup, and
    the dimension of the first cup-corresponding peripheral portion is a distance from a peripheral connection point, at which the first peripheral portion meets the second peripheral portion, to a point on the first peripheral portion corresponding to the upper end point of the lateral wall portion of the first cup.

3. The secondary battery case of claim 2, wherein a region, in which the first peripheral portion is connected to the second peripheral portion, is formed in a round shape having a first predetermined radius of curvature, and
    the first cup-corresponding peripheral portion comprises a first curved portion which is formed by a portion of the round shape and a first straight portion which is other than the first curved portion and has a straight shape.

4. The secondary battery case of claim 3, wherein the width of the first cup is greater than a sum of a dimension of the first curved portion and a dimension of the first straight portion.

5. The secondary battery case of claim 4, wherein
the first cup-corresponding peripheral portion and the second cup-corresponding peripheral portion form a predetermined angle hand have a V shape.

6. The secondary battery case of claim 5, wherein the predetermined angle is between about 130 degrees and about 170 degrees.

7. The secondary battery case of claim 6, wherein the first predetermined radius of curvature is approximately equal to or greater than 3 mm.

8. The secondary battery case of claim 1, wherein
a distance between a peripheral connection point-, at which the first peripheral portion meets the second peripheral portion, and a bridge connection point, at which a medial wall portion of the first cup is connected to a medial wall portion of the second cup, is less than about 1 mm.

9. The secondary battery case of claim 1, wherein
a region, in which a medial wall portion of the first cup is connected to a medial wall portion of the second cup, is formed in a round shape having a second predetermined radius of curvature, and
the second predetermined radius of curvature is less than about 2 mm.

10. The secondary battery case of claim 1, wherein
the width of the second cup is greater than a dimension of the second cup-corresponding peripheral portion.

11. The secondary battery case of claim 10, wherein the width of the second cup is measured as a distance from a medial wall portion of the second cup to a second reference vertical line which is perpendicular to the second peripheral portion and passes through an upper end point of a lateral wall portion of the second cup, and
the dimension of the second cup-corresponding peripheral portion is a distance from a peripheral connection point, at which the first peripheral portion meets the second peripheral portion, to a point on the second peripheral portion corresponding to the upper end point of the lateral wall portion of the second cup.

12. The secondary battery case of claim 11, wherein a region, in which the first peripheral portion is connected to the second peripheral portion, is formed in a round shape having a first predetermined radius of curvature, and
the second cup-corresponding peripheral portion comprises a second curved portion which is formed by a portion of the round shape and a second straight portion which is other than the second curved portion and has a straight shape.

13. The secondary battery case of claim 12, wherein the width of the second cup is greater than a sum of a dimension of the second curved portion and a dimension of the second straight portion.

14. A secondary battery comprising:
the secondary battery case of claim 1;
an electrode assembly provided within the secondary battery case; and
an electrolyte accommodated together with the electrode assembly within the secondary battery case.

15. A secondary battery case configured to accommodate an electrode assembly, comprising:
a cup having a recessed shape; and
a peripheral portion surrounding a perimeter of the cup when the secondary battery case is unfolded,
wherein the peripheral portion comprises a cup-corresponding peripheral portion that corresponds to a width of the cup,
wherein the width of the cup is greater than a dimension of the cup-corresponding peripheral portion in a width direction.

16. The secondary battery case of claim 15, wherein the width of the cup is measured as a distance from a first wall portion of the cup to a reference vertical line which is perpendicular to the peripheral portion and passes through an upper end point of a second wall portion of the cup, and
the dimension of the cup-corresponding peripheral portion is a distance from a peripheral connection portion, which is a point on the peripheral portion and along a fold line in which the secondary battery case is folded, to a point on the peripheral portion corresponding to the upper end point of the second wall portion of the cup.

17. The secondary battery case of claim 16, wherein the cup-corresponding peripheral portion comprises a curved portion having a predetermined radius of curvature and a straight portion.

18. The secondary battery case of claim 17, wherein the width of the cup is greater than a sum of a dimension of the curved portion and a dimension of the straight portion.

19. The secondary battery case of claim 15, further comprising an electrode assembly and an electrolyte provided within the secondary battery case.

* * * * *